United States Patent
Goodhill et al.

[11] Patent Number: 5,812,245
[45] Date of Patent: Sep. 22, 1998

[54] ASYNCHRONOUS CONTACT PRINTER FOR MOTION PICTURE FILM

[76] Inventors: Dean K. Goodhill, 8942 Wonderland Park Ave., Los Angeles, Calif. 90046-1430; Don P. Behrns, 13229 Rose Ave., Los Angeles, Calif. 90066

[21] Appl. No.: 624,702

[22] Filed: Mar. 26, 1996

[51] Int. Cl.$^6$ .................................................. G03B 27/04
[52] U.S. Cl. ............................... 355/97; 355/99; 355/101
[58] Field of Search ................................ 355/97, 99, 101, 355/111, 93, 91, 94, 40

[56] References Cited

U.S. PATENT DOCUMENTS

| | | | |
|---|---|---|---|
| 1,318,610 | 10/1919 | Sereinsky . | |
| 1,835,743 | 12/1931 | Aster . | |
| 1,921,494 | 8/1933 | Wildhaber . | |
| 1,999,754 | 4/1935 | Evans . | |
| 2,079,572 | 5/1937 | Kiel . | |
| 3,285,087 | 11/1966 | Wells | 74/330 |
| 3,565,521 | 2/1971 | Butler et al. | 352/163 |
| 3,606,536 | 9/1971 | Beispel | 355/91 |
| 3,661,457 | 5/1972 | Frech | 355/99 |
| 3,689,154 | 9/1972 | Swain et al. | 355/97 |
| 3,740,140 | 6/1973 | Wolf et al. | 355/91 |
| 3,762,619 | 10/1973 | Leavitt et al. | 355/91 |
| 3,778,155 | 12/1973 | Leavitt | 355/91 |
| 3,819,258 | 6/1974 | Butler et al. | 352/163 |
| 3,865,738 | 2/1975 | Lente | 352/44 |
| 4,053,230 | 10/1977 | Balousek | 355/111 |
| 4,120,572 | 10/1978 | Grallert et al. . | |
| 4,143,951 | 3/1979 | Suzaki et al. . | |
| 4,150,886 | 4/1979 | Merkel et al. . | |
| 4,243,317 | 1/1981 | Garbe et al. | 355/91 |
| 4,678,298 | 7/1987 | Perisic . | |
| 4,697,896 | 10/1987 | Fox | 352/180 |
| 4,893,921 | 1/1990 | Beauviala . | |
| 4,900,293 | 2/1990 | McLendon | 474/152 |
| 5,096,286 | 3/1992 | Weisgerber . | |
| 5,144,365 | 9/1992 | Visage | 355/91 |
| 5,218,388 | 6/1993 | Purdy . | |

(List continued on next page.)

OTHER PUBLICATIONS

"Too Costly for Prime Time", *Los Angeles Times* (Mar. 22, 1992).

"Editing a Whirlwind for 'Christmas'". *Daily Variety Special Report* (Mar. 16, 1992).

"Electronic Editing With Dean Goodhill", *Editors Guild Newsletter* (Winter 1992).

"You Want a Whole Movie by When?", *Calendar* (undated).

Advertisement for New Clairmont Super 1.85 (undated).

"Three–Perf Technology: Tomorrow's Film Format—Today", *International Photographer* (Oct. 1987).

"The Radial–Tooth, Variable–Pitch Sprocket," by J.G. Streiffert, Journal of the SMPTE, vol. 57, pp. 529–550 (Dec. 1951).

Publication re "Step Printers," Optical Printers, and Continuous Optical Printers, pp. 48–53 (Circa 1950's).

"Film Pulldown Mechanism Based On A Design By Samuel B. Grimson," by Frederick T. O'Grady, Journal of the SMPTE, vol. 67, pp. 385–388 (Jun. 1958).

*Primary Examiner*—R. L. Moses
*Assistant Examiner*—Shival Virmani
*Attorney, Agent, or Firm*—Knobbe, Martens, Olson & Bear, LLP

[57] ABSTRACT

An asynchronous contact printer and a related method for printing motion picture film in different formats. The contact printer has a pair of film drives that move duplicate film and original film at different increments through the printer, and then intermittently stop the film to permit exposure of the original onto the duplicate. The printer can print duplicate film in an alternate format, such as the three-perforation or 2.5-perforation format, from original film in another format, such as the four-perforation format. This is accomplished by moving the film asynchronously through the printer and exposing frames of the original film onto the duplicate film on a frame-by-frame basis.

41 Claims, 7 Drawing Sheets

U.S. PATENT DOCUMENTS

| | | | |
|---|---|---|---|
| 5,312,304 | 5/1994 | Vetter | 474/160 |
| 5,341,182 | 8/1994 | Schmidt . | |
| 5,359,390 | 10/1994 | Theimer | 355/99 |
| 5,394,220 | 2/1995 | Leonhart et al. | 355/99 |
| 5,424,805 | 6/1995 | Leonhart et al. | 355/94 |
| 5,506,639 | 4/1996 | Frazen et al. . | |
| 5,529,232 | 6/1996 | Blanding | 352/194 |
| 5,534,954 | 7/1996 | Vetter . | |
| 5,537,157 | 7/1996 | Washino et al. . | |
| 5,537,165 | 7/1996 | Miyamori et al. . | |
| 5,539,527 | 7/1996 | Kajimoto et al. . | |
| 5,543,869 | 8/1996 | Vetter . | |

ASYNCHRONOUS CONTACT PRINTER FOR MOTION PICTURE FILM

BACKGROUND OF THE INVENTION

The present invention relates to devices and methods for printing film and, more particularly, to a device and method for printing duplicate film in one format from original film in different format using an asynchronous contact printing technique.

Over 100 years ago, the industry standard specifications for 35 mm motion picture film were established. These specifications included all of the physical dimensions of the film including the placement of the sprocket holes (perforations) along the edges of the film with a longitudinal spacing of 0.187 inches between centers. Coincidentally, the height of the basic film frame (i.e., the longitudinal space allowed for each exposure) was established to be the equivalent of four times the distance between perforations. Because the nature of the conventional motion picture projection system is an intermittent frame-by-frame movement (pulldown) of the film, the term "four-perforation pulldown" has become associated with the industry standard film format.

Over the years, a number of attempts have been made to introduce alternate-standard film formats. The best known of these formats is the three-perforation pulldown format. This format provides a frame height which measures only three-perforations on the film instead of four. This reduced height was made possible by the introduction in the late 1950's of the 1.85:1 aspect ratio (width/height) picture which is now the standard of the American film industry. Because the increased width/height ratio is achieved by masking the top and bottom of the frame during projection, the result is a substantial waste of picture area within the four-perforation frame. By eliminating this wasted area, it is possible to fit the same picture area into the three-perforation frame height. The appeal of such a format, of course, is the potential saving of 25% in the cost of picture negative and processing and, more importantly, release prints which can number as many as 2,500 for a single film. Even more recently, a proposal has been made for an alternate-standard film format for release prints of 2.5 perforations. This format has the potential to virtually eliminate any wasted picture area due to masking, and to reduce the print footage by 37.5 percent over the conventional four-perforation format.

The introduction of alternate-standard film format for release printing that can provide these significant savings will almost certainly create a revolution in film exhibition and distribution. However, as previously discussed, the current standard of the industry is the four-perforation format. Whatever the value of the alternate formats, the reality is that an enormous base of installed projection equipment exists based on the four-perforation standard. Consequently, the transition from a four-perforation standard to any alternate standard will undoubtedly take place over a period of several years. During this transition period, many films will continue to be photographed with the conventional four-perforation cameras and many "pre-transition" four-perforation films will still be making the exhibition circuit. Additionally, there will always be a certain percentage of films shot in an anamorphic wide screen which requires full four-perforation pulldown projection. Therefore, there are several technological developments which must be introduced to facilitate this transition between formats.

In application Ser. No. 598,033 filed Feb. 7, 1996, which is incorporated herein by reference, an invention was disclosed and claimed for a "Switchable Pulldown Projection System." One of the objectives of this system is to facilitate the projection of alternate format prints with automatic changeover between formats. The system is designed to handle the mix of 2.5, three and four-perforation formats that will be presented for exhibition during the transition period noted above. The system also will probably have indefinite utility in order to handle the four-perforation "classic" films as well as the anamorphic (true wide-screen) productions which cannot convert to 2.5 or three-perforation prints without a reduction in their superior photographic quality.

Eventually, more and more productions will be shot using camera systems that have been modified to shoot in an alternate-format, such as the three-perforation format. From these three-perforation originals, it will be possible to make three-perforation release prints for use with the "Switchable Pulldown Projection System" using the conventional "contact" printing procedure. Contact printing is a process wherein the film negative (or master positive or duplicate negative) is placed in direct contact with unexposed print or negative stock. (The terms "master positive" and "interpositive" mean the same thing in the film industry.) As the two are passed together through the printer lamp house, light is directed through the negative onto the unexposed stock thereby creating a projection print. This exposure takes place on a continuous basis (as opposed to frame-by-frame) from the beginning to the end of the film, and thus the print is the same length as the negative.

However, those films which are still being shot with four-perforation format cameras will have to be converted to the 2.5 perforation or the three-perforation format in order to capitalize on the release print cost saving. This "conversion" will take place at the interpositive or the dupe-negative stage. Thereafter, the release prints, which can number as many as 2,500 per title, will be produced from the conversion copy, using the conventional contact printing method. Although conversion copies could be made using existing optical printers, these printers are generally designed for creating complex optical effects on a frame-by-frame basis. Consequently, they employ lenses between the negative and the duplicate stock. In essence they are like a projector and a camera pointing toward each other on a bench with a lens between them. The downside of the standard optical printer's use for conversion printing is that, because it uses a lens, the optics tend to sharpen perceivable film "grain," which many viewers and most directors and directors of photography would find objectionable.

In contrast, contact printing relies on direct emulsion-to-emulsion contact, with no lens involved. Therefore, contact printing at the conversion stage is the process of choice. Conventional contact printers, however, cannot handle this conversion because the original and the copy would have to move through the printer at different speeds.

Accordingly, a need exists for a contact printer and method for making release print masters in one format from a film negative or master positive in a different format. The present invention satisfies this need and provides further related advantages.

SUMMARY OF THE INVENTION

The present invention provides an asynchronous contact printer and a related method for printing motion picture film in different formats. The contact printer has a pair of film drives that advance duplicate film and original film at different increments through the printer, and then intermittently stop the film to permit exposure of the original onto the duplicate. In this way, the printer can print duplicate film in an alternate format, such as the three-perforation or 2.5 perforation format, from original film in another format, such as the four-perforation format. This is accomplished by moving the film asynchronously through the printer and exposing frames of the original film onto the duplicate film on a frame-by-frame basis.

During the actual printing process, the original film and the duplicate film will come into contact for a brief period that is only long enough to permit exposure of the original film onto the duplicate film. Thus, for example, between exposures, the printer will separate the two films, advance the original film by four-perforations, and advance the duplicate film by only 3.0 or 2.5 perforations. The film will then be brought back into contact again for the next exposure. This process is repeated thereafter for each successive frame of the original film.

In one embodiment of the invention, the printer includes a pair of film transport systems (i.e., the pair of film drives) for transporting the original film and the duplicate film through the printer. The film transport systems each include a plurality of sprockets having teeth for engaging perforations on the film, and a motive element that rotates the sprockets and moves the film intermittently, in a frame-by-frame manner, through a film gate of the printer. In this regard, the printer can be considered to consist of two "sides." "Side A" or the "original side" comprises the film transport for the original film, and "side B" or the "duplicate side" comprises the film transport for the duplicate film. The motive element rotates the sprockets on both sides at the same rotational speed in six 60-degree steps per revolution.

In accordance with the invention, the printer is designed to generate duplicate film on which the images are identical to those on the original film, but with either increased or decreased spacing between them. To accomplish this, in one embodiment, the printer is provided with different diameter sprockets on the two sides. The sprockets on the duplicate side are smaller than those on the original side and, therefore, for a given degree of rotation, the duplicate film travels a shorter distance than the original film. In this manner, the corresponding images are printed closer together on the duplicate film than they appear on the original film. Alternatively, the duplicate film can be made to travel a farther distance than the original film and thereby print the images farther apart. A controller is provided to regulate the motive element and thereby control the movement of both the original and the duplicate films.

A pin registration system, and feedback from a position sensing system, are used to assure accurate registration of both original and duplicate films in the film gate. Once advancement of the film has stopped, a series of registration pins are inserted into the perforations of each film strip to ensure a precise and positive alignment of the two film strips with respect to their relative positions within the printer and, therefore, with respect to each other. In addition, vacuum may be applied to each film strip to assist in preventing unwanted film movement.

In more detailed aspects of the invention, each of the film transport systems includes a pair of sprockets, one on each side of the film gate, and an intermittent sprocket between the two for advancing the film frame-by-frame through the printer gate. The rotational speed of each pair of sprockets is determined by a multi-speed motor which is pre-set by the operator based on the desired printer speed. The rotational movement and positioning of each of the intermittent sprockets is determined by another motor, such as a high-response servomotor. The controller coordinates the output of the multi-speed motor and the servomotor. The multi-speed motor which drives the pair of sprockets on the original side also drives a control disk which has a series of apertures equally spaced around its circumference. A photocell and light source straddle the control disk, such that each time an aperture on the rotating control disk passes between them, light is allowed to pass and a pulse is emitted from the photocell. These pulses are fed to the controller where they are processed to control the output of both servomotors, one on each side (side A and side B).

The initial movement of each servomotor for each frame change is controlled by the output of the control disk. Each time a pulse is emitted from the photocell, the controller signals both servomotors to advance by one step (60-degrees of rotation), thereby advancing the original film by four-perforations (one standard frame) and the duplicate film by either 2.5 or three-perforations (one alternate frame), depending on the diameter and number of teeth on the side B registration sprocket. A positioning disk rotated by each servomotor, in combination with another photocell/light set, is employed to feed information to the controller regarding sprocket position (and, therefore, film position) to assure proper registration of each frame of both the original and the duplicate in the film gate. If desired, redundant photocell/light sets may be provided on the control disk and each positioning disk.

In order to accommodate the movement of the original film and the duplicate film strips at different speeds without causing abrasion, the original film is separated from the duplicate film during their advancement through the printer. This is accomplished by providing platens that the film moves across, and mounting the film transport and the platen for the duplicate side on a pivoting arm. When this arm is lifted by a rotating cam, the duplicate film and the original film are separated just long enough for the film movement to take place. When the movement has been completed, the cam allows the arm to close, with the assistance of a return spring, thereby bringing the platens together and causing the duplicate film to come back into contact with the original film for the exposure process. The sequence is then repeated for each succeeding exposure.

The lamp house used for the exposure phase of the process can be an adaptation of a condenser-type lamp house or one of the standard lamp houses currently used in conventional contact printers. Other suitable light sources to expose the original film onto the duplicate film may be used as desired. Regardless of the lamp house that is used, it must be housed within an enclosure (to prevent light leakage), properly ventilated, and equipped with a shutter that closes to block light during advancement of the film and then opens to permit the exposure when the film stops. An aperture in the platen for the original film also is provided to permit passage of light to the film. Of course, it will be appreciated that the entire printer also must be enclosed within a housing to block unwanted ambient light that could expose or fog the duplicate film.

The printer of the present invention also can be bidirectional. For some period of time, films that have been shot with three-perforation camera systems will still have some venues which have not converted to variable pulldown projection. Therefore, in these situations, it will be necessary to create a four-perforation master from the three-perforation negative so that four-perforation contact release prints can be made. Hence the printer must be capable of operating in reverse. This would require an aperture in the platen normally traversed by the duplicate film. Of course, if the printer has two apertures, one in each platen, the unused aperture may be blocked by appropriate means.

Other features and advantages of the present invention will become apparent from the following description of the invention, taken in conjunction with the accompanying drawings, which illustrate by way of example, the principles of the invention.

BRIEF DESCRIPTION OF THE DRAWINGS

The accompanying drawings illustrate the invention. In such drawings.

DESCRIPTION OF THE PREFERRED EMBODIMENT

As shown in the exemplary drawings, the present invention is embodied in an asynchronous contact printer, generally referred to by the reference number 10, for use in printing motion picture film. In accordance with the invention, the printer 10 is especially designed to print duplicate film 12 in one format from original film 14 in another format. For example, the original film 14 may be in the standard four-perforation format, and the duplicate film 12 may be in an alternate format, such as the 3.0 or 2.5 perforation format. As described below, the printer 10 is able to carry out contact printing of the film by moving the duplicate film 12 and the original film 14 through the printer 10 by different increments, and then intermittently stopping the film during exposure.

As used herein, the term "original film" refers to the film strip from which images are transferred. Thus, the original film may comprise, for example, an original spliced negative, a master positive, or any other film strip from which images are to be transferred to another film strip. The term "duplicate film" refers to the unexposed film strip that receives the images transferred from the original film and, thereafter, becomes exposed film.

Figure 1:
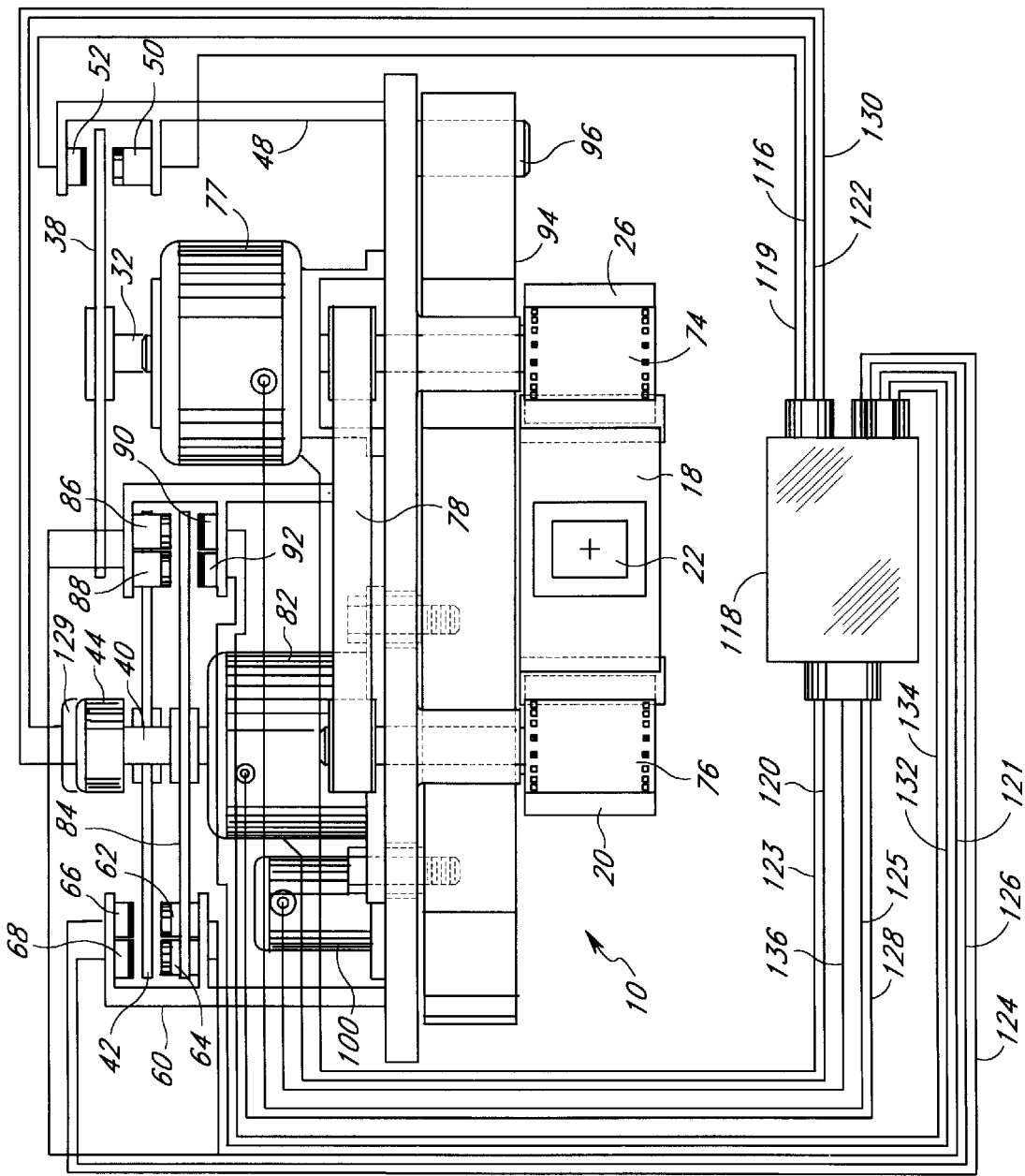
FIG. 1 is an elevational view of an asynchronous contact printer for motion picture film embodying the novel features of the present invention.
Figure 2:
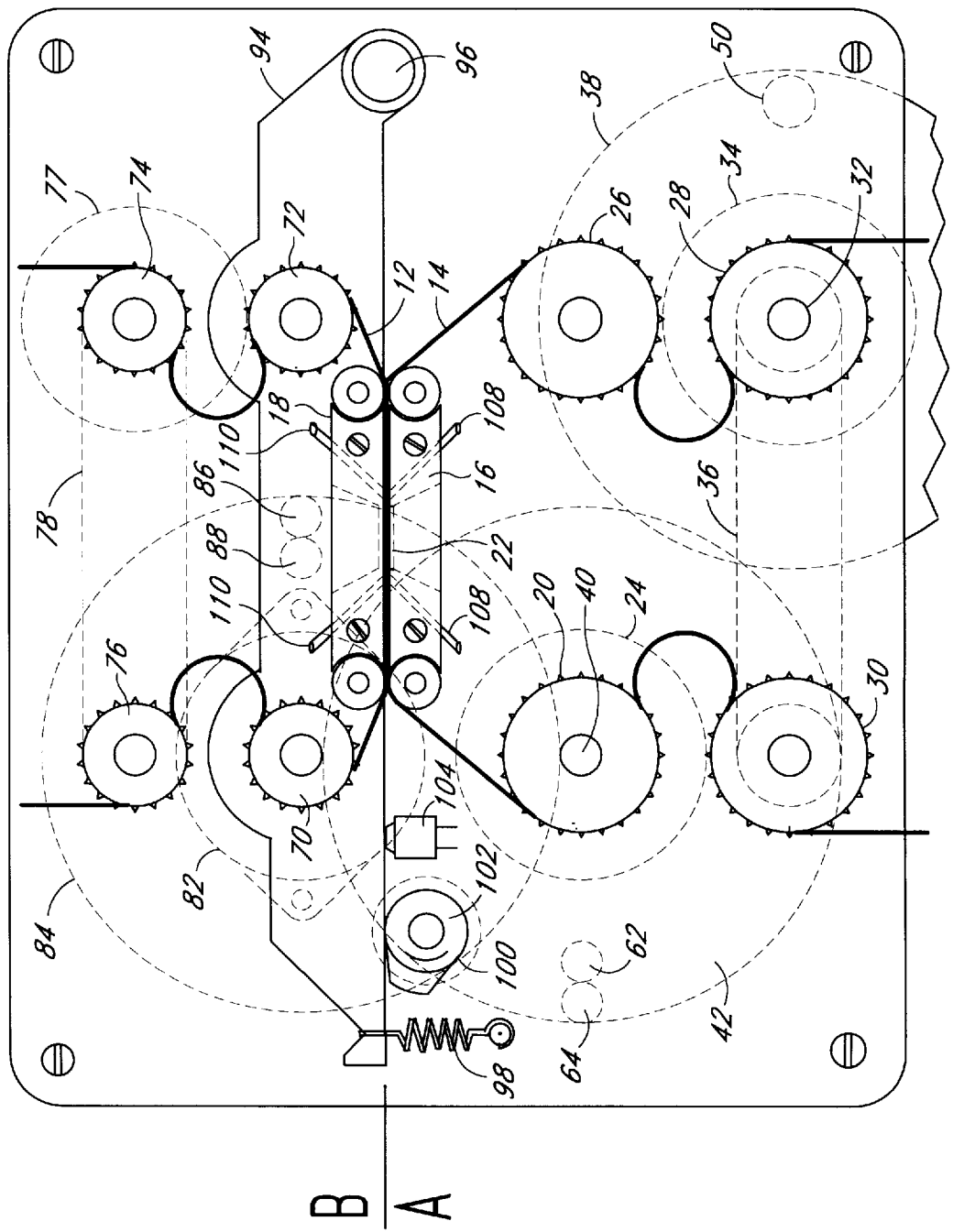
FIG. 2 is a bottom schematic plan illustration of the printer of FIG. 1, showing the printer in a stage of operation in which original film in one format is exposed onto duplicate film in another format.

FIGS. 1–2 illustrate one embodiment of the asynchronous contact printer 10. As shown in these drawings, the original film 14 is fed across a first platen 16 and the duplicate film 12 is fed across a second platen 18. Both of these platens 16 and 18 face each other, and the film 12 and 14 is fed across them by film drives using a plurality of sprockets. Thus, the surface of each platen 16 and 18 across which the film 12 and 14 moves is substantially smooth to minimize friction and abrasion of the film. The platens 16 and 18 are shown as being flat, but they may be curved or take another appropriate configuration as desired.

For purposes of explanation, the printer 10 can be considered as having two substantially identical sides. Side "A" corresponds to the side of the printer 10 that transports the original film 14, and side "B" corresponds to the side of the printer that transports the duplicate film 12. It will be understood, therefore, that the following description with respect to side A of the printer 10 applies equally to side B, except where indicated otherwise.

The film drive on side A includes an electronically controlled registration sprocket 20 that controls the movement and registration of the original film 14. The platen 16 contains an aperture 22 over which each frame of the original film 14 is registered during the exposure phase of the printing process. The registration sprocket 20 is driven by a servomotor 24 in an intermittent manner, similar to the manner in which an intermittent sprocket is driven in a motion picture projector. Thus, as described further below, the registration sprocket 20 also moves the original film 14 across the platen 16 in an intermittent, frame-by-frame manner.

The remaining sprockets on side A of the printer comprise a hold-back sprocket 26, a feed sprocket 28 and a take-up sprocket 30. The hold-back sprocket 26 maintains tension on the original film 14 as it moves across the platen 16. The feed sprocket 28 and the take-up sprocket 30 feed the original film 14 to and take it away from the registration sprocket 20 at a continuous rate. Since the original film 14 moves intermittently (i.e., starts and stops in a relatively rapid cycle), the feed sprocket 28 and the take-up sprocket 30 maintain slack in the film, in the form of loops of loose film, to prevent film breakage.

The feed sprocket 28 is driven by an output shaft 32 a multi-speed motor 34, such as a multi-speed crystal controlled motor. The feed sprocket 28 and the take-up sprocket 30 are linked together for common rotation by a belt 36. Thus, upon rotation of the feed sprocket 28, the take-up sprocket 30 is driven via the belt 36 at the same speed.

The multi-speed motor 34 also rotates a control disk 38. The control disk 38 and the feed sprocket 28 are connected to opposite ends of the output shaft 32, which extends from opposite sides of the multi-speed motor. Thus, the feed sprocket 28 and the control disk 38 are rotated at the same rotational speed by the multi-speed motor 34.

The servomotor 24 also has an output 40 shaft extending from each side. One end of the output shaft 40 is connected for rotation to the registration sprocket 20, and the other end of the output shaft rotates a positioning disk 42. The servomotor 24 also rotates a velocity tachometer 44 at the outermost end of the output shaft 40.

Figure 6:
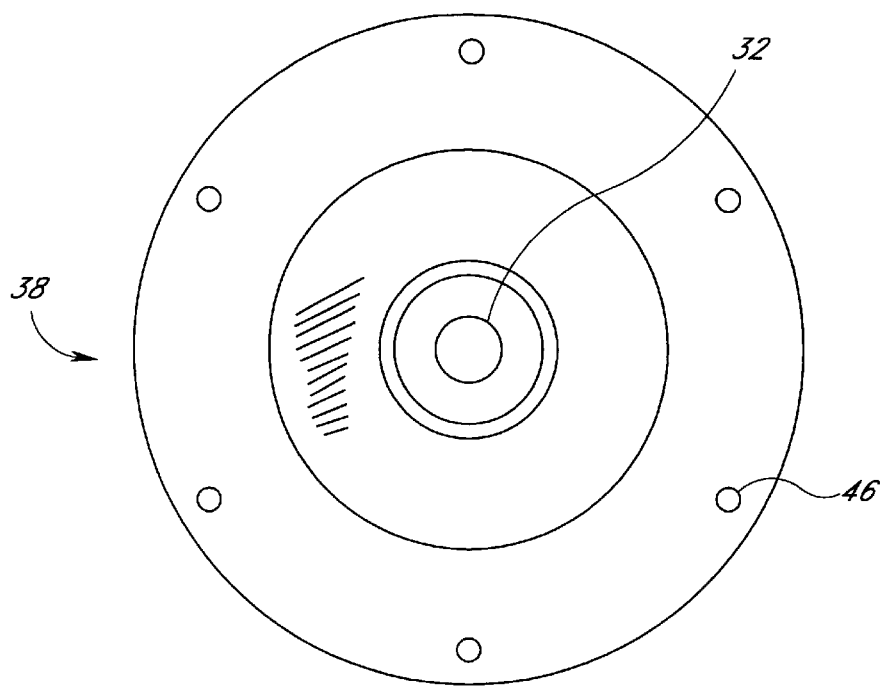
FIG. 6 is a plan view of a control disk used for controlling operation of the printer.

FIG. 6 shows the control disk 38 in more detail. The control disk 38 includes a plurality of apertures 46 that are equally spaced around the circumference of the disk. As shown in FIG. 1, a bracket 48 mounted adjacent to the control disk 38 carries a light source 50 that projects a beam of light toward the control disk. The beam of light registers with the apertures 46 in the control disk 38, such that the beam of light passes through each aperture when the control disk is rotated. A photocell 52 carried by the bracket 48 on the opposite side of the control disk 38 receives the beam of light each time one of the apertures 46 passes between the light source 50 and the photocell 52.

Figure 7:
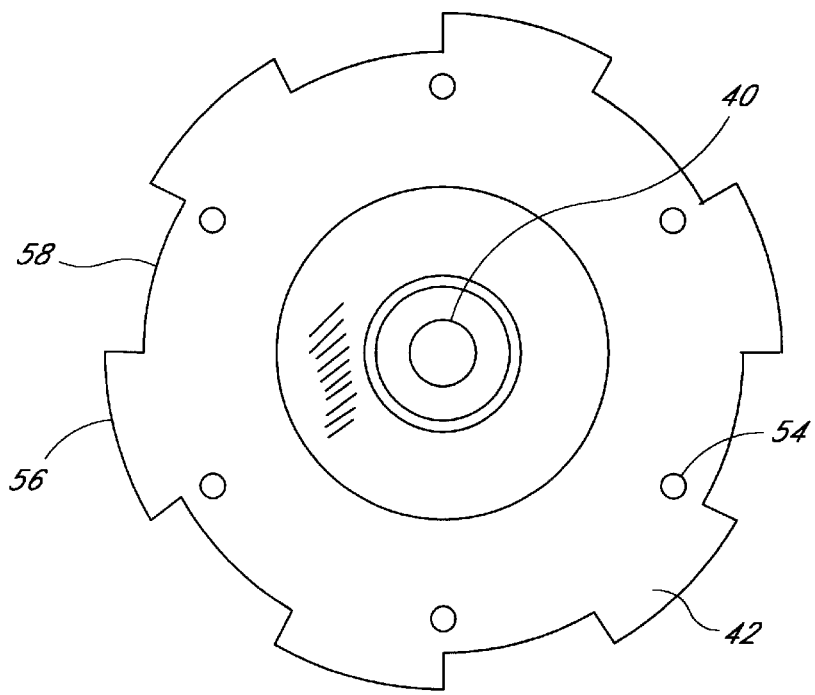
FIG. 7 is a plan view of a positioning disk also used for controlling operation of the printer.

FIG. 7 shows the positioning disk 42 in more detail. Like the control disk 38, positioning disk 42 has a plurality of apertures 54 that are equally spaced around its circumference. The circumferential edge of the positioning disk 42 also is provided with a number of equally spaced vanes 56 and spaces 58 between each vane.

Referring again to FIG. 1, a bracket 60 mounted adjacent to the positioning disk 42 carries two light sources 62 and 64 that each project a beam of light toward the positioning disk. One light source 62 projects a beam of light that registers with the apertures 54 in the positioning disk 42, such that a beam of light passes through each aperture when the positioning disk is rotated. Similarly, the other light source 64 projects a beam of light that passes to the other side of the positioning disk 42 through the spaces 58 between each vane 56. Two photocells 66 and 68 also are mounted on the bracket 60 on opposite sides of the positioning disk 42 in respective registration with the two light sources 62 and 64. These photocells 66 and 68 receive the beams of light that pass through the apertures 54 and spaces 58 between the vanes 56 during rotation of the positioning disk 42.

Side B of the printer, which transports the duplicate film 12, contains essentially the same components as side A described above. Thus, side B of the printer 10, in addition to the duplicate film 12 and platen 18 previously described, has a registration sprocket 70, a hold-back sprocket 72, a feed sprocket 74 and a take-up sprocket 76 (driven in unison by a multi-speed motor 77 via a drive belt 78), a servomotor 82 and a positioning disk 84 with two sets of light sources 86 and 88 and photocells 90 and 92. The control disk 38 on side A of the printer 10 controls movement of both the original film 14 and the duplicate film 12 on both sides A and B. Therefore, as explained below, a second control disk is not necessary for the multi-speed motor 77 on side B of the printer. The components described above for both side A and side B can be appropriately mounted on a table 93 or the like.

To prevent abrasion between the original film 14 and the duplicate film 12 during their respective advancement across the oppositely facing platens 16 and 18, it is necessary to separate the film during the period of advancement. This separation of the film 12 and 14 is provided by separating the two platens 16 and 18 across which the film moves. When film advancement has been completed, the two platens 16 and 18 are then moved back together, thereby bringing the duplicate film 12 back into contact with the original film 14 during the period of exposure.

Figure 3:
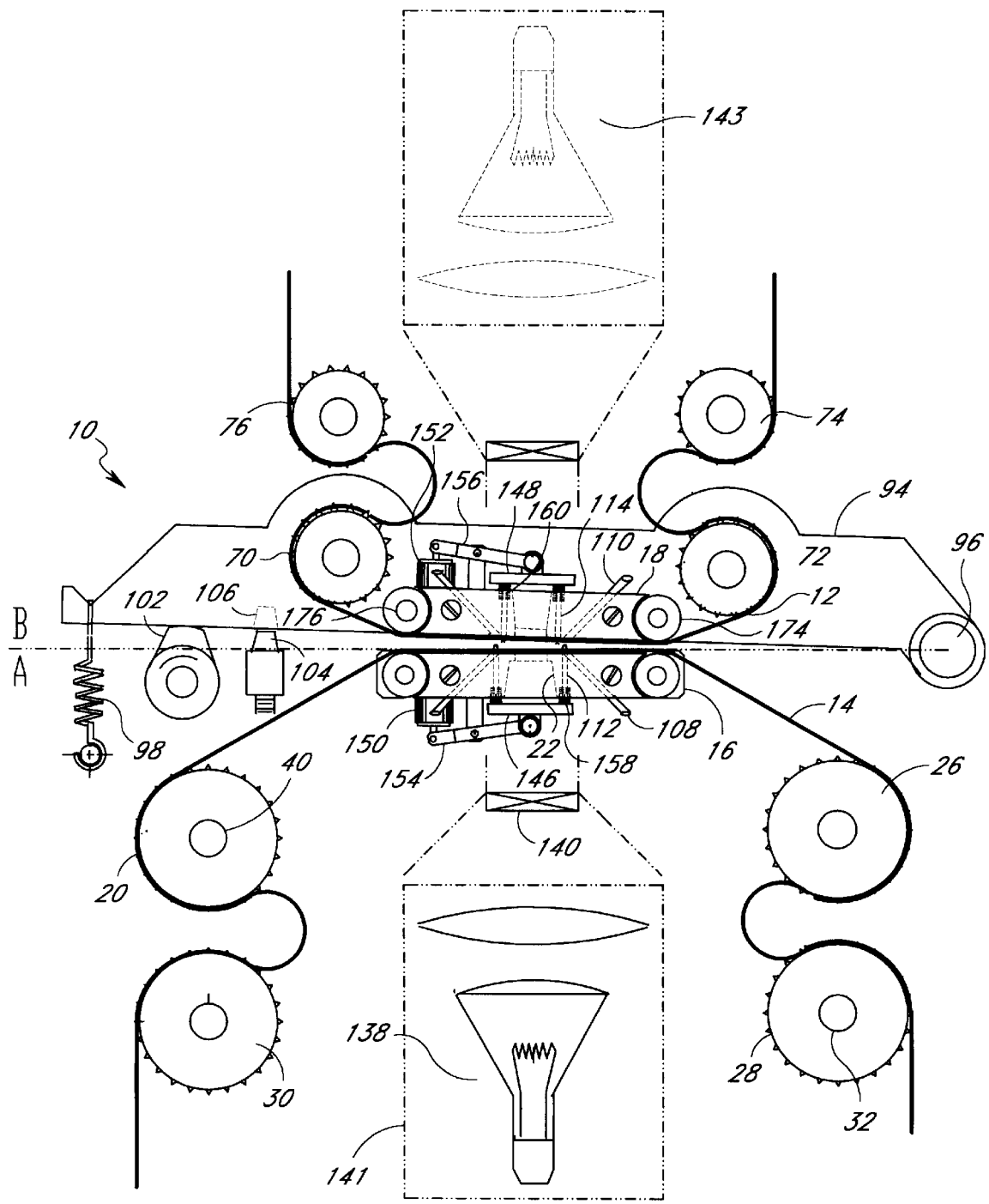
FIG. 3 is another bottom schematic plan illustration of the printer, showing the printer in a stage of operation that permits advancement of the original film through the printer at one speed and advancement of the duplicate film at another speed.

FIG. 3 illustrates the printer 10 in a stage of operation where the platens 16 and 18 are separated to provide spacing between the original film 14 and the duplicate film 12 during film advancement. Separation between the film is achieved by mounting the platen 18 for the duplicate film 12 on side B, and its associated registration sprocket 70 and hold-back sprocket 72, on a pivot arm 94. One end of the pivot arm 94 is pivotally connected to the printer 10 about a pivot point 96, and the other end of the arm is movably connected to the printer by a biasing means, such as a return spring 98, that permits that end of the arm to move a limited distance.

Pivoting movement of the pivot arm 94 is provided by a stepping motor 100 and a separation cam 102. When the stepping motor 100 receives an appropriate signal, it rotates the cam 102 by one revolution. This rotation causes the cam 102 to contact the pivot arm 94, move it to an open position, and temporarily separate the two platens 16 and 18 during the period of film advancement. The pivot arm 94 is returned to a normally closed position by the return spring 98 when the cam 102 is not in contact with the pivot arm.

Pressure on the film 12 and 14 while the pivot arm 94 is in the normally closed position may be controlled by a stop pin 104 on side A of the printer 10. The stop pin 104 is adjustable in very precise increments so that it can protrude outwardly toward the pivot arm 94 by a desired distance. In the normally closed position of the pivot arm 94, the stop pin 104 is received in a registration hole 106 in the pivot arm. By appropriate adjustment of the stop pin 104, the amount of separation between the two platens 16 and 18 when the pivot arm 94 is closed can be controlled. The speed of the stepping motor 100 and the profile of the separation cam 102 can be designed as desired to provide the appropriate "open" time for separating the two platens 16 and 18 during film advancement.

It will be appreciated that other appropriate means may be employed to cause separation between the duplicate film 12 and the original film 14 during film advancement, and to bring the two film strips together for the exposure phase of the process. For example, one of the two platens 16 and 18 may be mounted for displacement in a parallel plane with respect to the non-displaced platen by guide pins or the like. Alternatively, the two platens 16 and 18 may be hinged together along their longitudinal edges to open and close in a manner similar to the pivot arm 94. Still further, the platens 16 and 18 may be mounted with respect to each other by means of a four bar linkage that displaces one of the platens with respect to the other. Other appropriate means will be apparent to accomplish the required separation and contact between the film 12 and 14.

Each of the platens 16 and 18 is provided with vacuum ports 108 and 110, respectively, that extend through the platens and terminate at the opposing surfaces of the platens that support the film 12 and 14. During the exposure phase of the printing cycle, when advancement of the original film 14 and the duplicate film 12 has stopped, a relatively high level of vacuum is maintained in the vacuum ports 108 and 110 to ensure that the film 12 and 14 is securely held with respect to the platens 16 and 18 and does not move. During film advancement, however, the vacuum is reduced to a minimum level sufficient to hold the film 12 and 14 close to their respective platens 16 and 18, to thereby keep the film surfaces apart, yet still allow advancement across the platens without undue abrasion. A series of registration pins 112 and 114 also are provided in each of the platens 16 and 18, respectively, to ensure proper film registration prior to the exposure phase of the printing cycle. These features are described in more detail below.

Operation of the printer 10, together with a discussion of its further features and advantages, will now be explained. For purposes of this explanation, it will be assumed that the original film 14 has a four-perforation format, with each frame spanning four perforations, and the duplicate film 12 to be created from unexposed duplicate print stock will be printed in the three-perforation format, with each frame spanning three perforations.

Figure 8:
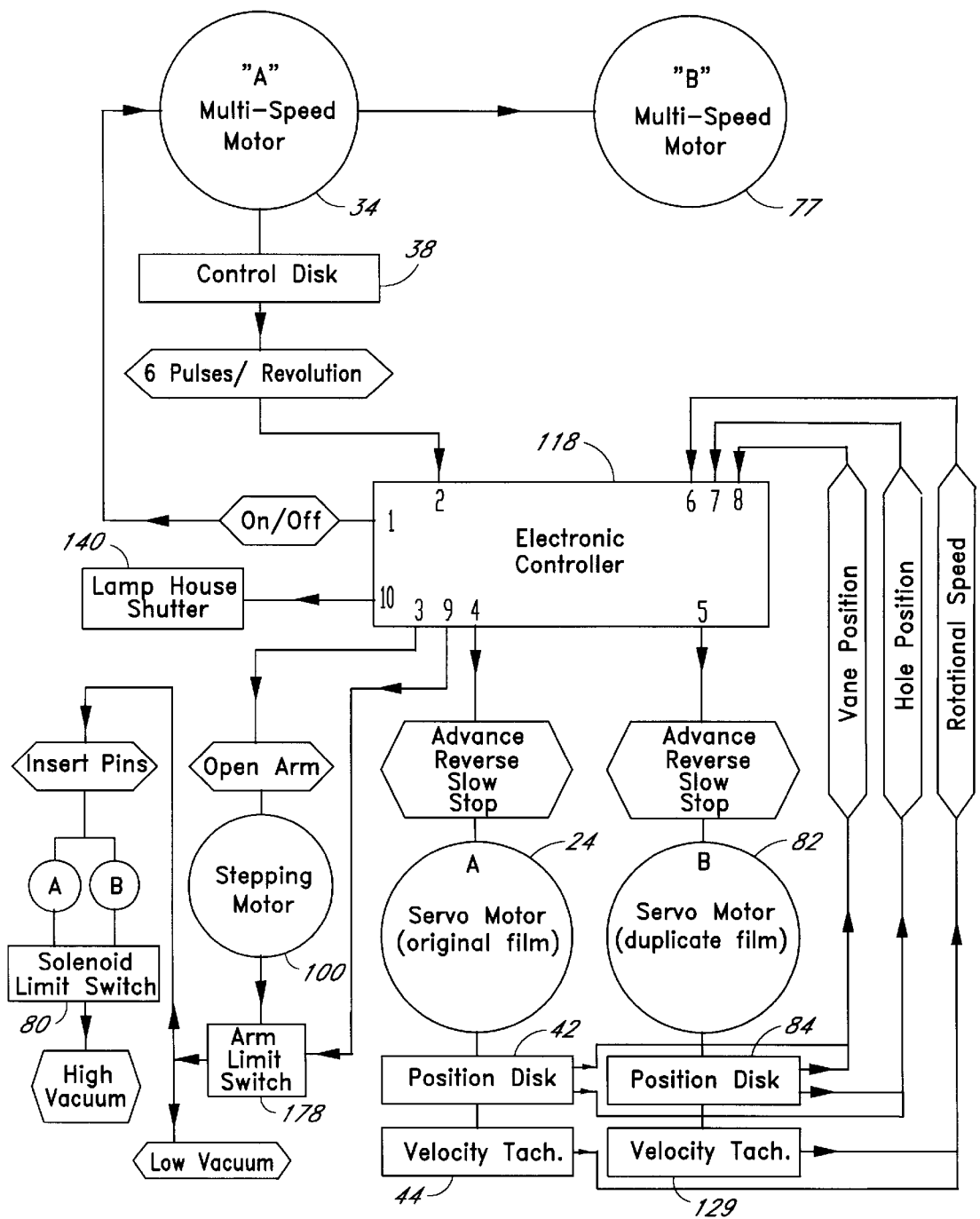
FIG. 8 is a flow diagram showing the interrelationship between various components of the printer and an electronic controller.

The electronic controller 118 is at the center of control for all of the operations described below. FIG. 8 presents a flow diagram depicting the flow of signals into and out of the controller 118. Input signals (2, 6, 7, 8) include frame-advance pulses and feedback signals from the positioning disks 42 and 84 and velocity tachometers 44 and 129. Output signals (1, 3, 4, 5, 9, 10) include signals to advance and position both the original and duplicate films 12 and 14, to open the pivot arm 94, to change the vacuum level, to insert and retract the registration pins 112 and 114, and to actuate the lamp house shutter 140. References below to FIG. 8 will be followed by a "dash" and a number that corresponds to the appropriate input or output signal path, as indicated by numbers within the controller box (e.g., FIG. 8-1, etc.).

Starting with side A, an electronic controller 118 is operated to turn on the light source 50 via a signal 119 and to turn on the light sources 62, 64, 86 and 88 via another signal 121. (FIG. 1). The electronic controller 118 via signal 123 also energizes and commands the multi-speed motor 34 to rotate at the desired printing speed (FIG. 8-1). This results in rotation of the feed sprocket 28 and take-up sprocket 30 in the film advance direction, thereby supplying and taking up equal amounts of the original film 14 in the vicinity of the platen 16. Simultaneously, the multi-speed motor 34 rotates the control disk 38, which causes a pulse 116 to be emitted from the photocell 52 each time an aperture 46 registers with the beam of light from the light source 50, thereby allowing light to pass to the photocell 52.

The control disk 38 on side A has six equally-spaced apertures 46 around its periphery and, consequently, six pulses 116 are emitted by the photocell 52 for every revolution of the control disk (FIG. 8-2). Each aperture 46, and therefore each pulse 116, corresponds to the advance of one frame of the original film 14 across the platen 16. Since the positioning disk 42 completes one revolution in six steps in synchronization with the control disk 38, and since the registration sprocket 20 rotates in unison with the positioning disk 42, the twenty-four tooth registration sprocket 20 advances the original film 14 by four perforations per step (i.e., by one conventional frame).

Figure 4:
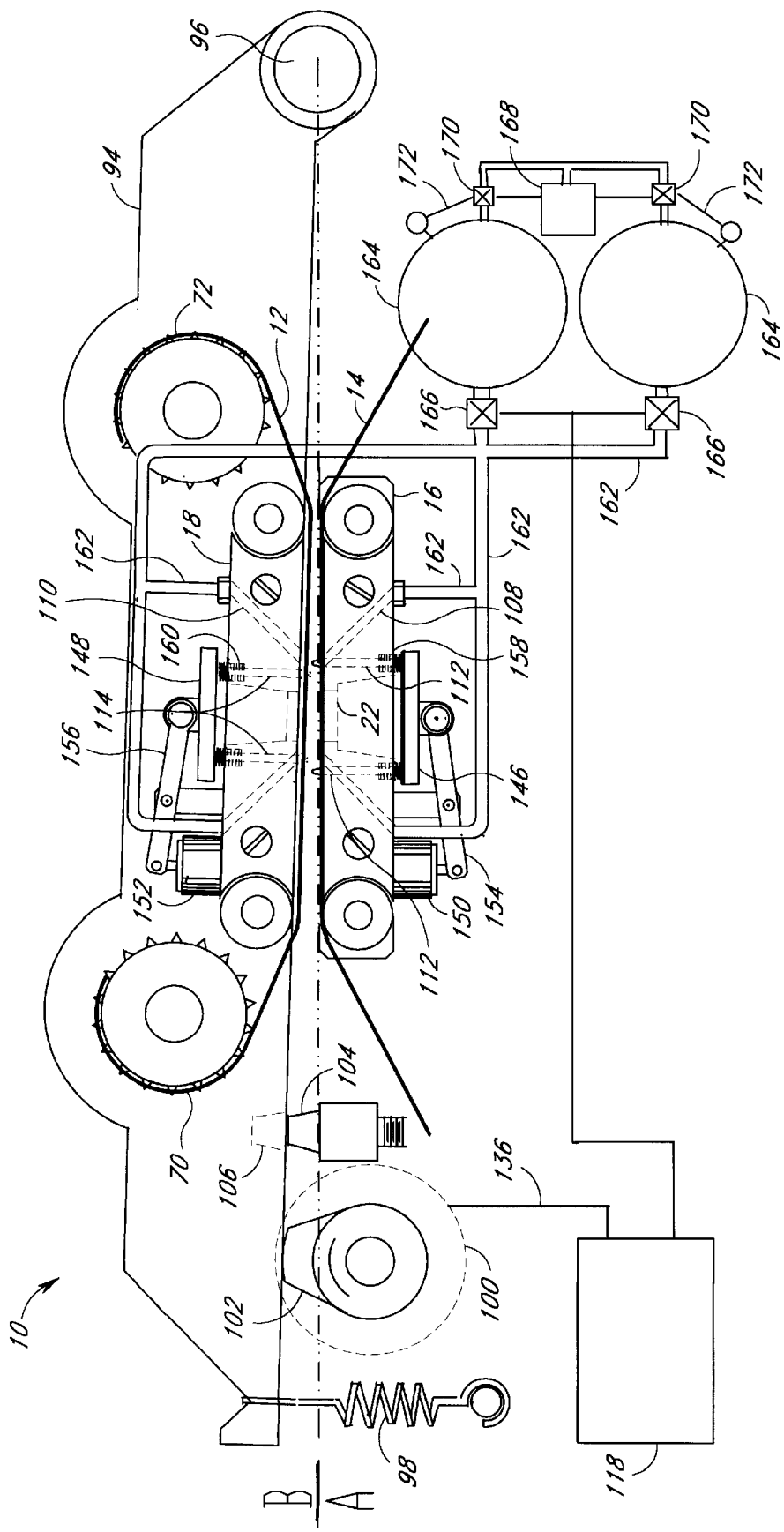
FIG. 4 is another schematic plan view of the printer, similar to FIG. 3, showing a pin registration feature of the printer.

The pulses 116 emitted from the photocell 52 for the control disk 38 are applied to an electronic controller 118 (FIG. 8-2). The electronic controller 118 converts these pulses 116 into signals 120 that control operation of the servomotor 24 (FIG. 8-4). The registration sprocket 20 is thus also driven by these signals 120, such that each signal 120 initiates rotation of the registration sprocket 20 by one step. As the registration sprocket 20 is driven, the original film 14 is advanced across the platen 16 by a distance corresponding to four perforations (i.e., one frame) for each output pulse 116 from the photocell 52 of the control disk 38. During this operation, the electronic controller 118 ensures that each frame of the original film 14 is positioned precisely with respect to the aperture 22 in the platen 16. This is accomplished in the following manner.

As the registration sprocket 20 rotates the original film 14 into registration with the aperture 22, the positioning disk 42 is sensing the position of the registration sprocket and, likewise, the position of the film frame, by means of the apertures 54 and vanes 56 of the positioning disk 42 that permit beams of light from the light sources 62 and 64 to be received by the corresponding photocells 66 and 68. At the same time, the velocity tachometer 44 is sensing the rotational speed of the registration sprocket. Through a system of feedback signals 122, 124 and 126 (FIG. 8-6,7,8), this information is being continuously monitored by the electronic controller 118, where it is used to shape the voltage waveform in accordance with the need to accelerate, decelerate or stop the servomotor 24 (FIG. 8-4). In this manner, the frames of the original film 14 can be rapidly moved into registration with the aperture 22 and positioned with great accuracy. Such a feedback system is generally described in U.S. Pat. No. 3,819,258, which is incorporated herein by reference.

On side B of the printer, essentially the same series of events described above is taking place to control advancement of the duplicate film. The multi-speed motor 77 via a signal 125 from the controller 118 is energized and commanded to rotate at the desired printing speed.

This results in rotation of the feed sprocket 74 and the take-up sprocket 76 in the film advance direction, thereby supplying and taking up equal amounts of the duplicate film 12 in the vicinity of the platen 18.

The same pulses 116 from the photocell 52 for the control disk 38 on side A are used by the electronic controller 118 to trigger movement of the duplicate film 12 on side B. Thus, these pulses 116 (FIG. 8-2) are received by the electronic controller 118, which, in response, sends signals 128 (FIG. 8-5) to the servomotor 82 on side B. This servomotor 82 rotates both the registration sprocket 70, the positioning disk 84 and a velocity tachometer 129, which control movement and registration of the duplicate film 12 using a similar system of feedback signals 130, 132 and 134 (FIG. 8-6, 7, 8). This positioning disk 84 and its associated registration sprocket 70 must complete one revolution (in six steps) in synchronization with the control disk 38. Likewise, the registration sprocket 20 on side A of the printer 10 also is rotating in synchronization with the control disk 38. The duplicate film 12, however, is only required to advance by three perforations, while the original film 14 is advancing by four perforations. Therefore, the diameter of the registration sprocket 70 on side B of the printer 10 must be reduced by a ratio of (3.0/4.0)×24 teeth. This ratio results in a registration sprocket 70 on side B having 18 teeth.

If the duplicate film 12 were to be desired to be printed in the 2.5-perforation format, then the registration sprocket 70 would need to be changed to a 15-tooth sprocket. Other formats for the duplicate film 12 can be provided as desired.

As noted above, in order for the original film 14 and the duplicate film 12 to be advanced at different increments without creating undue abrasion, it is necessary to separate the film strips during their advancement through the printer 10. Thus, the pivoting arm 94 pivots the platen 18 on side B away from the platen 16 on side A to separate the film strips 12 and 14 during film advancement. When film advancement has stopped, the pivoting arm 94 is returned to its normally closed position. This brings the two platens 16 and 18 back together and moves the duplicate film 12 into contact with the original film 14. The operation of the stepping motor 100, which rotates the separation cam 102, is controlled by a signal 136 (FIG. 8-3) that slightly precedes the signal 120 (FIG. 8-1) that initiates film movement. Thus, the speed of the stepping motor 100, together with the profile of the separation cam 102, establishes an "open" period that separates the film 12 and 14 prior to its advancement through the printer 10.

When movement of the film 12 and 14 has stopped, exposure occurs and the image from the frame on the original film 14 is exposed onto the duplicate film 12. This exposure is achieved by illumination from a light source. For example, the light source may comprise a printer lamp house 138 containing three lamps, one for each primary color. These lamps may be individually adjustable in intensity and, consequently, appropriate controls can be used to adjust both intensity of the exposure and the color balance. The technology of the lamp house 138 and the associated exposure and color control are well known in the art and can be readily adapted from conventional contact printing equipment currently available. Alternately, a condenser-type lamp house may be used with subtractive filter packs. This alternate technology is also well known in the art.

However, since the original film 14 and the duplicate film 12 advance in different increments, illumination must be blocked during the period of film advancement. Accordingly, a shutter 140 is provided in the lamp house 138 to block illumination during film advancement, and to permit illumination and exposure when the film advancement has stopped. In this regard, the lamp house 138 is positioned so that it is substantially aligned with the aperture 22 over which frames of the original film 14 are registered during the exposure phase. The lamp house 138 also is completely encased within an enclosure 141, with proper ventilation, to permit illumination only through the shutter 140, when opened.

In conventional synchronous contact printers, precise registration of the original film and the duplicate film is assured by "sandwiching" the two strips of film on the same sprocket wheels, such that each tooth of the sprockets penetrates the perforations in both film strips. Since the teeth are machined to fit the perforations exactly, and since the teeth penetrate both strips of film, the registration of the film's perforations and, therefore, the frame lines and photographic images, will remain constant and precise.

In the asynchronous contact printer 10 of the present invention, however, this approach to film registration is not possible for at least two reasons. First, the two film strips 12 and 14 are being advanced by different increments and, therefore, cannot be aligned with respect to each other by using the same sprocket teeth or registration pins. Second, when converting from one frame format to another, such as four-perforation to three-perforation, the edge perforations will be offset and therefore will no longer be aligned. As a result, it will not be possible to penetrate the perforations of both film strips 12 and 14 with a single pin to assure registration.

Although it is believed that the accuracy of the electronic positioning system (using the servomotors 24 and 82, positioning disks 42 and 84, electronic controller 118, etc.), described above, is sufficient to provide the required registration accuracy, it is desirable to have a more positive approach. Therefore, the present invention offers an alternate approach to the conventional sprocket teeth and pin registration techniques. This alternate approach should provide even more accurate positioning.

Figure 5:
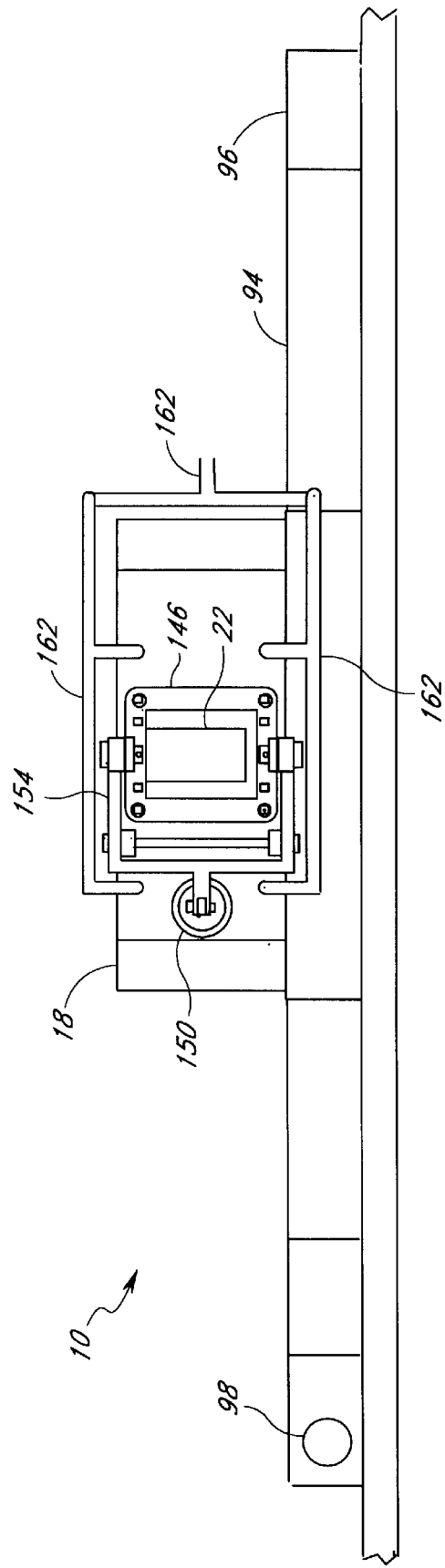
FIG. 5 is an elevational view of the printer of FIG. 4.

The design, which is best described with reference to FIGS. 3–5, is to provide asymmetric pin registration from both sides A and B of the printer 10. During the period that the printer's pivot arm 94 is open and the two film strips 12 and 14 are separated and advanced, the strips are pre-positioned by the electronic controller 118, in the manner described above. Once the film advancement has stopped, precision machined, tapered registration pins 112 and 114 are inserted into the perforations of each film strip 12 and 14, respectively, to provide a final and positive alignment of the two strips.

The signal to insert the registration pins 112 and 114 originates at the controller 118 (FIG. 8-9), and comprises a signal to lower the vacuum level, followed by a signal to actuate the pin registration solenoids 166. Before either of these signals is allowed to pass, a limit switch 178 (FIG. 8) must be closed by the opening of the pivot arm 94. This ensures that the film strips 12 and 14 are stationary and separated before inserting the registration pins 112 and 114. Once the registration pins 112 and 114 are inserted, increased vacuum is then applied to each film strip 12 and 14 from the vacuum ports 108 and 110 to hold the film securely in place on the platens 16 and 18. Another limit switch 180 on the pin solenoids 166 ensures that the registration pins 112 and 114 are in place before the high vacuum is applied. Thereafter, the registration pins 112 and 114 are retracted, and the pivot arm 94 is closed for the exposure portion of the cycle.

More particularly, four registration pins 112 and 114 are provided for each platen 16 and 18, with each registration pin having one end mounted into a pin block 146 and 148 on each side. The other ends of the registration pins 112 and 114 are received within precision drilled holes in each platen 16 and 18. An electrically operated solenoid 150 and 152 on each side is employed in conjunction with a rocker arm 154 and 156 on each side to depress each pin block 146 and 148 against return springs 158 and 160 interposed between the pin blocks 146 and 148 and the platens 16 and 18 on each side.

Vacuum is applied to the side of the film strips facing the platens 16 and 18 via the vacuum ports 108 and 110. Two levels of vacuum are required. First, a low level is applied for holding the film 12 and 14 in position while the registration pins 112 and 114 are in the process of engaging and some slight registration movement is required. (Alternatively, no vacuum may be needed or applied during this operation.) Second, a high level is applied for holding the film securely in place throughout the closing of the pivot arm 94 and the film exposure. The vacuum is provided to the vacuum ports 108 and 110 by tubes 162 connected to one or more vacuum tanks 164. Solenoid valves 166 may be employed to control the application of the vacuum to the ports 108 and 110. Vacuum is maintained in the vacuum tanks 164 by a vacuum pump 168. Pressure switches 170 attached to the vacuum tanks 164 send a signal 172 to the solenoid valves 166 and vacuum pump 168 when the vacuum level needs boosting.

When the electronic controller 118 stops advancement of the film 12 and 14 after it has been properly positioned, a series of signals is sent out from the controller. These signals comprise the following: a signal to engage the registration pins 112 and 114; a signal to apply high vacuum; a signal to retract the registration pins 112 and 114 (after which the pivot arm 94 closes); a signal to open and then close the shutter 140 of the lamp house 138 to permit exposure of the frame (FIG. 8-10); a signal to open the pivot arm 94; a signal to change from high to low vacuum; and a signal to advance the film 12 and 14. In this manner the printer 10 is capable of making conversion film copies from one format to another while still maintaining the picture quality and image steadiness achieved in conventional continuous contact printing.

In one aspect of the invention, a second lamp house 143 may be provided on side B of the printer 10. Alternatively, the lamp house 138 may be reversible in its position so it can be moved from side A to side B of the printer 10. Thus, whenever it becomes necessary to make a four-perforation duplicate from a three perforation or 2.5-perforation original, the lamp house 138 can be moved to side B of the printer 10, and the aperture 22, which can take the form of a replaceable aperture plate, can be moved from the side A platen 16 to the side B platen 18.

The original film 14 would then be loaded on the "B" side and the duplicate film 12 would be loaded on the "A" side. The film transport and exposure process would then proceed exactly as described above. The platen 16 or 18 from which the aperture plate has been removed may be replaced with a plug or other appropriate means (not shown) to block illumination.

Although it is not shown in the drawings, it will be appreciated that the duplicate film 12 must be housed in a light-tight film magazine. A design such as that used by a Mitchell-type or Panavision camera would be appropriate. These magazines would be loaded with unexposed duplicate film 12 in a darkroom, then presented for loading in the asynchronous contact printer 10 with the end of the unexposed duplicate film exiting the magazine and returning into it, leaving a portion of the film outside the magazine for threading. This film 12 would then be drawn around the feed sprocket 74 and holdback sprocket 72 (forming a loop between them) and retained on those sprockets by shoes of the type typically used for film retention on sprockets. The film 12 would then be threaded past platen rollers 174, through the platen 18, around further platen rollers 176 and thereafter to the registration sprocket 70, the take-up sprocket 76, and finally back into the take-up side of the magazine. Naturally, retention shoes will also be used on the sprockets 70 and 76.

Once the printer 10 is threaded with the duplicate film 12 on side B, and side A is threaded in a similar manner with the original film 14 (appropriately leadered), the entire printer 10 must then be sealed within a light-tight enclosure which provides ventilation access for the lamp house 138. The "duplicate side" is usually side B of the printer 10, but it can also be side A, given the bidirectionality of the design, described above. Following all of this, the printer operation can commence. When the roll of original film 14 has been fully copied, the duplicate side will stop on the last printed frame. At that point, the duplicate side will be light-sealed separately from the original side such that the already-copied original film 14 can be removed and replaced without inadvertent exposure of the duplicate film 12. The light seals can then be removed and printing can continue.

From the foregoing, it will be appreciated that conversion print masters in alternate-standard formats, such as 2.5-perforation and three perforation, can be made from four-perforation originals, and vice-versa, without resorting to optical printing techniques which degrade the quality of the copy and, consequently, every release print which would be made from that master. The end result would be high quality master prints in a format that will allow the generation of release prints at a cost saving of up to 37.5%.

While a particular form of the invention has been illustrated and described, it will be apparent that various modifications can be made without departing from the spirit and scope of the invention. Accordingly, it is not intended that the invention be limited, except as by the appended claims.

We claim:

1. A method of printing duplicate film from original film in a contact printer, comprising:

separating a first platen of the contact printer from a second platen of the contact printer;

advancing original film across the first platen by a distance substantially equal to one frame, wherein the original film has a first format having frames spanning a first pre-determined number of perforations;

advancing unexposed duplicate film across the second platen by a distance corresponding to a selected number of perforations;

stopping advancement of the original film when said one frame is registered with respect to an aperture of the contact printer;

stopping advancement of the duplicate film when it has advanced by said distance corresponding to said selected number of perforations;

bringing the first and second platens together to thereby bring the original film and the duplicate film into contact with each other; and exposing an image from said one frame of the original film onto the duplicate film, to thereby create duplicate film in a second format having frames spanning a second pre-determined number of perforations.

2. The method of claim 1, further comprising:

separating the duplicate film and the original film during their advancement through the printer; and bringing the original film and the duplicate film into contact with each other when the advancement of the original film and the duplicate film has stopped.

3. The method of claim 1, wherein the duplicate film is advanced through the printer by a distance corresponding to three perforations each time the original film is advanced by one frame.

4. The method of claim 1, wherein the duplicate film is advanced through the printer by a distance corresponding to 2.5 perforations each time the original film is advanced by one frame.

5. The method of claim 1, wherein the duplicate film is advanced through the printer by a distance corresponding to four perforations each time the original film is advanced by one frame.

6. The method of claim 1, wherein the first format of the original film comprises a format in which each frame spans four perforations.

7. The method of claim 1, wherein the second format of the duplicate film comprises a format in which each frame spans three perforations.

8. The method of claim 1, wherein the second format of the duplicate film comprises a format in which each frame spans 2.5 perforations.

9. The method of claim 1, further comprising applying vacuum to bring the duplicate film into contact with the second platen and to bring the original film into contact with the first platen when advancement of said film has stopped and said platens are separated from each other.

10. The method of claim 9, wherein the vacuum is eliminated or applied in a reduced amount to the duplicate film and the original film during advancement through the printer, and wherein the vacuum is applied in an increased amount to the duplicate film and the original film when said advancement has stopped.

11. The method of claim 1, further comprising inserting a plurality of registration pins into the perforations of the duplicate film and the original film when advancement of the film has stopped.

12. The method of claim 2, wherein a film drive for advancing the duplicate film through the printer is mounted on a movable element, further comprising moving the movable element such that the duplicate film is moved away from and thereby substantially separated from the original film as the duplicate film and the original film are advanced through the printer.

13. The method of claim 12, further comprising moving the movable element such that the duplicate film moves toward the original film and thereby brings the duplicate film into contact with the original film when advancement of the duplicate film and the original film has stopped.

14. The method of claim 12, wherein the movable element comprises a pivot arm that is pivoted by operation of a cam.

15. The method of claim 1, further comprising operating a light source to expose the image from said one frame of the original film onto the duplicate film.

16. The method of claim 15, wherein the light source is reversible such that it can be moved to opposite sides of the printer.

17. A method of printing duplicate film in one format from original film in another format in a contact printer, wherein the original film has a first format having frames spanning a first pre-determined number of perforations, comprising:

separating a first platen of the contact printer from a second platen of the contact printer;

advancing the original film across the first platen by a distance corresponding to one of said frames, while advancing unexposed duplicate film across the second platen by a distance corresponding to a selected number of perforations;

stopping advancement of the original film each time one of said frames is registered with respect to an aperture of the contact printer, while stopping advancement of the duplicate film each time it has advanced by said selected number of perforations;

applying sufficient vacuum to bring the original film into contact with the first platen and to bring the duplicate film into contact with the second platen and thereby substantially prevent movement of such film with respect to said platens when said platens are separated from each other;

bringing said platens together to thereby bring the original film and the duplicate film into contact with each other;

exposing images from said frames of the original film onto the duplicate film, each time the advancement of the original film and the duplicate film has stopped, to thereby create duplicate film in a second format having frames spanning a second pre-determined number of perforations; and separating the platens and reducing the vacuum applied to the original film and the duplicate film to allow advancement of the original film across the first platen and advancement of the duplicate film across the second platen.

18. An asynchronous contact printer for printing duplicate film from original film, wherein the original film has a first format having frames spanning a first pre-determined number of perforations, comprising:

a first film drive that intermittently advances the original film across a first platen, and that stops advancement of the original film each time one of its frames is registered with respect to an aperture in the printer;

a second film drive that intermittently advances the duplicate film across a second platen, and that stops the duplicate film each time it has advanced by a distance corresponding to a selected number of perforations;

an actuator that separates the first platen from the second platen and that returns first platen back together with the second platen; and a light in substantial alignment with respect to the aperture that is selectively operable to expose images from said frames of the original film onto the duplicate film, to thereby create duplicate film in a second format having frames spanning a second pre-determined number of perforations.

19. The asynchronous contact printer of claim 18, further comprising:

an arm on which the first platen is mounted; and an actuator that moves the arm and thus moves the first platen away from the second platen, and that returns the arm and thus brings the first platen back together with the second platen.

20. The asynchronous contact printer of claim 19, wherein the arm comprises a pivot arm that pivots the first platen with respect to the second platen, and wherein the actuator comprises a cam that causes pivoting movement of the pivot arm.

21. The asynchronous contact printer of claim 20, further comprising a stepping motor for operating the cam.

22. The asynchronous contact printer of claim 20, further comprising a biasing element for normally biasing the pivot arm against pivoting movement.

23. The asynchronous contact printer of claim 22, wherein the biasing element comprises a spring.

24. The asynchronous contact printer of claim 18, further comprising vacuum ports in each of the first and second platens that apply vacuum to the original film and the duplicate film.

25. The asynchronous contact printer of claim 24, wherein vacuum is created in the vacuum ports by a vacuum tank that can be regulated to eliminate or apply reduced vacuum during advancement of the duplicate film and the original film, and to apply increased vacuum when the advancement of the duplicate film and the original film has stopped.

26. The asynchronous contact printer of claim 18, further comprising first registration pins that register the original film with respect to the aperture when advancement of the original film has stopped.

27. The asynchronous contact printer of claim 26, further comprising second registration pins that register the duplicate film with respect to the original film when advancement of the duplicate film has stopped.

28. The asynchronous contact printer of claim 18, wherein the first format of the original film comprises a format in which each frame spans four perforations.

29. The asynchronous contact printer of claim 18, wherein the second format of the duplicate film comprises a format in which each frame spans three perforations.

30. The asynchronous contact printer of claim 18, wherein the second format of the duplicate film comprises a format in which each frame spans 2.5 perforations.

31. The asynchronous contact printer of claim 18, wherein the second format of the duplicate film comprises a format in which each frame spans four perforations.

32. The asynchronous contact printer of claim 18, further comprising a controller that controls and coordinates advancement of the original film and the duplicate film at different increments through the printer;

stopping of the original film and the duplicate film each time one of the frames of the original film is registered with the aperture and the duplicate film has advanced by said selected number of perforations; and operation of the light to expose images from said frames of the original film onto the duplicate film.

33. The asynchronous contact printer of claim 18, wherein the light has a shutter that blocks illumination when the original film and the duplicate film are advancing through the printer, and that permits illumination when the advancement of the original film and the duplicate film has stopped.

34. An asynchronous contact printer for printing duplicate film from original film, wherein the original film has a first format having frames spanning a first pre-determined number of perforations, comprising:

a first platen having an aperture;

a second platen;

a first film drive that intermittently advances the original film across the first platen, and that stops advancement of the original film each time one of its frames is registered with respect to the aperture;

a second film drive that intermittently advances the duplicate film across the second platen, and that stops the duplicate film after it has advanced by a distance corresponding to a selected number of perforations;

means for separating the first and second platens to substantially prevent contact between the original film and the duplicate film during advancement of the original film and the duplicate film by the first and second film drives;

means for bringing the first and second platens together to thereby bring the original film and the duplicate film into contact each time one of said frames of the original film is registered with respect to the aperture and advancement of the original film and the duplicate film by the first and second film drives has stopped; and a light in substantial alignment with the aperture to expose images from said frames of the original film onto the duplicate film, when advancement of the original film and the duplicate film by the first and second film drives has stopped, to thereby create duplicate film in a second format having frames spanning a second predetermined number of perforations.

35. The asynchronous contact printer of claim 36, wherein:

the first film drive comprises a first servomotor for intermittently registering the frames of the original film with respect to the aperture, and a first multispeed motor for feeding the original film to and taking it away from the first platen; and the second film drive comprises a second servomotor for intermittently advancing the duplicate film, and a second multispeed motor for feeding the duplicate film to and taking it away from the second platen.

36. The asynchronous contact printer of claim 34, wherein the means for separating the first and second platens and the means for bringing said platens together comprises:

an arm on which the first platen is mounted; and an actuator that moves the arm and thus moves the first platen away from the second platen, and that returns the arm and thus allows the first platen to move back together with the second platen.

37. The asynchronous contact printer of claim 34, further comprising a stop pin that controls the amount of separation between the first and second platens when said platens are moved together.

38. The asynchronous contact printer of claim 34, wherein the stop pin has one end connected to a portion of the printer that supports the second platen and another end that is received in a registration hole on another portion of the printer that supports the first platen.

39. The asynchronous contact printer of claim 38, wherein the stop pin is adjustable to change the amount of separation between the first and second platens.

40. A method of printing duplicate film in one format from original film in another format in a contact printer, wherein the original film has a first format having frames spanning a first pre-determined number of perforations, comprising:

separating a first platen of the contact printer from a second platen of the contact printer;

advancing the original film across the first platen by a distance corresponding to one of said frames, while advancing unexposed duplicate film across the second platen by a distance corresponding to a selected number of perforations;

stopping advancement of the original film each time one of said frames is registered with respect to an aperture of the contact printer, while stopping advancement of the duplicate film each time it has advanced by said selected number of perforations;

inserting registration pins into the perforations of the original film and duplicate film;

applying sufficient vacuum to bring the original film into contact with the first platen and to bring the duplicate film into contact with the second platen and thereby substantially prevent movement of such film with respect to said platens when said platens are separated from each other;

retracting the registration pins from the perforations of the original film and the duplicate film;

bringing said platens together to thereby bring the original film and the duplicate film into contact with each other;

exposing images from said frames of the original film onto the duplicate film, each time the advancement of the original film and the duplicate film has stopped, to thereby create duplicate film in a second format having frames spanning a second pre-determined number of perforations; and separating the platens and reducing the vacuum applied to the original film and the duplicate film to allow advancement of the original film across the first platen and advancement of the duplicate film across the second platen.

41. An asynchronous contact printer for printing duplicate film from original film, wherein the original film has a first format having frames spanning a first pre-determined number of perforations, comprising:

a first platen having an aperture;

a second platen;

a first film drive that intermittently advances the original film across the first platen, and that stops advancement of the original film each time one of its frames is registered with respect to the aperture;

a second film drive that intermittently advances the duplicate film across the second platen, and that stops advancement of the duplicate film after it has advanced by a distance corresponding to a selected number of perforations;

means for separating the first and second platens to substantially prevent contact between the original film and the duplicate film during advancement of the original film and the duplicate film by the first and second film drives;

means for bringing the first and second platens together to thereby bring the original film and the duplicate film into contact each time one of said frames of the original film is registered with respect to the aperture and advancement of the original film and the duplicate film by the first and second film drives has stopped;

a vacuum source;

vacuum ports in each of the first and second platens connected to the vacuum source for applying sufficient vacuum to bring the original film into contact with the first platen and to bring the duplicate film into contact with the second platen, and thereby substantially prevent movement of such film with respect to said platens when said platens are separated from each other and advancement of said film has stopped, and for reducing the vacuum applied to the original film and the duplicate film to allow advancement of such film across said platens; and a light in substantial alignment with the aperture to expose images from said frames of the original film onto the duplicate film, when advancement of the original film and the duplicate film by the first and second film drives has stopped, to thereby create duplicate film in a second format having frames spanning a second pre-determined number of perforations.

* * * * *